US010600219B2

(12) United States Patent
Bauchspies

(10) Patent No.: US 10,600,219 B2
(45) Date of Patent: *Mar. 24, 2020

(54) PATTERN MAPPING

(71) Applicant: IDEX ASA, Fornebu (NO)

(72) Inventor: Roger A. Bauchspies, Gustine, CA (US)

(73) Assignee: IDEX ASA, Fornebu (NO)

( * ) Notice: Subject to any disclaimer, the term of this patent is extended or adjusted under 35 U.S.C. 154(b) by 165 days.

This patent is subject to a terminal disclaimer.

(21) Appl. No.: 15/192,099

(22) Filed: Jun. 24, 2016

(65) Prior Publication Data

US 2017/0004642 A1    Jan. 5, 2017

Related U.S. Application Data

(60) Provisional application No. 62/185,004, filed on Jun. 26, 2015.

(51) Int. Cl.
G06T 11/60     (2006.01)
G06K 9/00      (2006.01)

(52) U.S. Cl.
CPC .......... *G06T 11/60* (2013.01); *G06K 9/00087* (2013.01)

(58) Field of Classification Search
CPC ..... G06T 11/60; G06T 5/001; G06K 9/00087; G06K 9/00013; G06K 9/00026
See application file for complete search history.

(56) References Cited

U.S. PATENT DOCUMENTS

| | | | |
|---|---|---|---|
| 4,573,201 A | 2/1986 | Hashiyama et al. | |
| 5,067,162 A | 11/1991 | Driscoll, Jr. et al. | |
| 5,799,098 A | 8/1998 | Ort et al. | |
| 5,828,773 A | 10/1998 | Setlak et al. | |
| 5,845,005 A | 12/1998 | Setlak et al. | |
| 5,852,670 A | 12/1998 | Setlak et al. | |
| 5,909,501 A | 6/1999 | Thebaud | |

(Continued)

FOREIGN PATENT DOCUMENTS

| | | |
|---|---|---|
| EP | 1183638 A1 | 3/2002 |
| EP | 3121758 A1 | 1/2017 |

OTHER PUBLICATIONS

Lockie, Mark, ed. The Biometric Industry Report—Forecasts and Analysis to 2006. Elsevier, 2012. p. 97-132.*

Maio, Dario, and Davide Maltoni. "Direct gray-scale minutiae detection in fingerprints." IEEE transactions on pattern analysis and machine intelligence 19.1 (1997): 27-40. (Year: 1997).*

Jiang, Xudong, We Yun Yau, and Wee Ser. "Minutiae extraction by adaptive tracing the gray level ridge of the fingerprint image." Proceedings 1999 International Conference on Image Processing (Cat. 99CH36348). vol. 2. IEEE, 1999. (Year: 1999).*

(Continued)

*Primary Examiner* — Menatoallah Youssef
(74) *Attorney, Agent, or Firm* — Kilpatrick Townsend & Stockton LLP

(57) ABSTRACT

A system, method, and computer program product for efficiently mapping a pattern, such as a fingerprint, from a set of multiple impressions of portions of that pattern. The system may evaluate images of patterns taken from a series of multiple impressions and map the pattern from the image portions while providing the operator with realtime feedback of a status of the set of images. As each new image portion is evaluated, a display graphic or other indicator provides feedback when a new image portion is added to the reconstructed image, or when a new image portion is not added (such as it representing a duplicate). Other status indications may be provided, and when the indication is visual, a degraded resolution of the pattern map may be provided on the display graphic to improve security.

20 Claims, 6 Drawing Sheets

(56) References Cited

U.S. PATENT DOCUMENTS

| | | | |
|---|---|---|---|
| 5,926,555 A | 7/1999 | Ort et al. | |
| 6,241,288 B1 | 6/2001 | Bergenek et al. | |
| 6,285,789 B1 | 9/2001 | Kim | |
| 6,330,588 B1 * | 12/2001 | Freeman | G06F 9/4862 709/202 |
| 6,546,122 B1 | 4/2003 | Russo | |
| 6,795,569 B1 | 9/2004 | Setlak | |
| 6,836,554 B1 | 12/2004 | Bolle et al. | |
| 6,895,104 B2 | 5/2005 | Wendt et al. | |
| 7,027,626 B2 | 4/2006 | Funada | |
| 7,142,699 B2 | 11/2006 | Reisman et al. | |
| 7,203,347 B2 * | 4/2007 | Hamid | G06K 9/0002 340/5.53 |
| 7,236,617 B1 * | 6/2007 | Yau | G06K 9/00026 382/125 |
| 7,330,571 B2 | 2/2008 | Svensson et al. | |
| 7,330,572 B2 | 2/2008 | Uchida | |
| 7,512,256 B1 | 3/2009 | Bauchspies | |
| 7,574,022 B2 | 8/2009 | Russo | |
| 7,599,530 B2 | 10/2009 | Boshra | |
| 7,616,787 B2 | 11/2009 | Boshra | |
| 7,634,117 B2 | 12/2009 | Cho | |
| 7,643,660 B1 | 1/2010 | Bauchspies | |
| 7,787,667 B2 | 8/2010 | Boshra | |
| 7,912,256 B2 | 3/2011 | Russo | |
| 7,970,186 B2 | 6/2011 | Bauchspies | |
| 8,295,561 B2 | 10/2012 | Kwan | |
| 8,638,994 B2 | 1/2014 | Kraemer et al. | |
| 9,135,494 B2 | 9/2015 | Boshra et al. | |
| 9,202,099 B2 | 12/2015 | Han et al. | |
| 2005/0238211 A1 * | 10/2005 | Du | G06K 9/00026 382/124 |
| 2007/0263912 A1 | 11/2007 | Biarnes et al. | |
| 2009/0083847 A1 | 3/2009 | Fadell et al. | |
| 2014/0003677 A1 * | 1/2014 | Han | G06K 9/00006 382/124 |
| 2014/0003681 A1 | 1/2014 | Wright et al. | |
| 2015/0135108 A1 | 5/2015 | Pope et al. | |
| 2015/0294131 A1 | 10/2015 | Neskovic et al. | |
| 2016/0063300 A1 * | 3/2016 | Du | G06K 9/00033 382/124 |
| 2017/0004350 A1 | 1/2017 | Clausen | |
| 2017/0004642 A1 | 1/2017 | Bauchspies | |

OTHER PUBLICATIONS

Lockie, Mark, ed. The Biometric Industry Report—Forecasts and Analysis to 2006. Elsevier, 2012. p. 97-132 (Year: 2006).*

Maio, Dario, and Davide Maltoni. "Direct gray-scale minutiae detection in fingerprints." IEEE transactions on pattern analysis and machine intelligence 19.1 (1997): 27-40. (Year: 1997).*

Jiang, Xudong, We Yun Yau, and Wee Ser. "Minutiae extraction by adaptive tracing the gray level ridge of the fingerprint image." Proceedings 1999 International Conference on Image Processing (Cat. 99CH36348). vol. 2. IEEE, 1999. (Year: 1999).*

Uludag U "Biometric Template Selection and Update: A Case Study in Fingerprints" Pattern Recognition, Elsevier, GB, vol. 37, No. 7, Jul. 1, 2004 (Jul. 1, 2004), pp. 1533-1542, XP004508402, ISSN: 0031-3203, DOI:10.1016/J.PATCOG.2003.11.012.

Extended European Search Report for EPO Application No. 16176395.. 8-1901, dated Dec. 22, 2016.

Anil Jain et al., "Fingerprint Mosaicking" Proceedings of IEEE International Conference on Acoustics, Speech, and Signal Processing (ICASSP), Orlando, Florida, May 13-17, 2002.

Arun Ross et al., "Image Versus Feature Mosaicing: A Case Study in Fingerprints" Proc. of SPIE Conference on Biometric Technology for Human Identification III, (Orlando, USA), pp. 620208-1-620208-12, Apr. 2006.

Koichi Ito, et al., "A Fingerprint Matching Algorithm Using Phase-Only Correlation", IEICE Trans. Fundamentals, vol. E87-A, No. 3, Mar. 2004.

Koichi Ito, et al., "A Fingerprint Recognition Algorithm Combining Phase-Based Image Matching and Feature-Based Matching" D. Zhang and A.K. Jain (Eds.) ICB 2005, LNCS 3832, pp. 316-325, 2005 (C) Springer-Verlag Berlin, Heidelberg 2005.

Koichi Ito, et al., "A Fingerprint Recognition Algorithm Using Phase-Based Image Matching for Low-Quality Fingerprints" 0-7803-9134-9/05/$20.00 (C) 2005 IEEE.

Sandhya Tarar et al., "Fingerpring Mosaicking Algorithm to Improve the Performance of Fingerprint Matching System" Computer Science and Information Technology 2(3): 142-151, 2014.

Y.S. Moon et al., "Template Synthesis and Image Mosaicking for Fingerprint Registration: An Experimental Study" 0-7803-8484-9/04/$20.00 (C) 2004 IEEE.

* cited by examiner

PATTERN MAPPING

CROSS REFERENCE TO RELATED APPLICATIONS

This application claims benefit of U.S. Patent Application No. 62/185,004, the contents of which are hereby expressly incorporated in its entirety by reference thereto for all purposes.

FIELD OF THE INVENTION

The present invention relates generally to automated machine-implemented pattern mapping, and more specifically, but not exclusively, to systems, methods, and computer program products for generation of a pattern map from a set of image portions, such as, for example, an image used in pattern verification systems, methods, and computer program products.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Pattern verification, such as in a context of registration of a trusted fingerprint into a trusted memory of a fingerprint verification system, requires a sufficiently accurate and precise image of the trusted fingerprint. This image may be obtained directly from an imaging sensor. This may be suitable for large area imaging sensors. However, for many applications, the trusted image is reconstituted from image portions of the trusted fingerprint taken from a sensor having a sensing area smaller than the final image. For many mobile applications and electronic platforms, such as smartphones and the like, the use of the small sensor provides a smaller form factor having a lower cost of goods which is important to implementation and adoption. However use of the smaller sensor impacts registration and user experiences during verification.

Any mobile electronic platform having a fingerprint verification system typically includes a registration system that establishes and writes one or more trusted images into a trusted database/memory. Test fingerprints are compared against the trusted image(s) using a matching engine that matches features of interest from the test fingerprint against features of interest from the trusted image(s). A quality of the test image and of the trusted images impact the user experience.

Whatever the size of the imaging sensor, the trusted image may be derived from a single impression from a single finger, or derived from a composition of multiple impressions. Each solution offers different challenges.

It is technically possible to rely on a single impression of a single finger using a small area sensor for registration. However, during use, the user must not only recall which portion of which finger was registered, but each verification attempt relies on the user reimaging this same portion of the same finger sufficiently close that it may be matched. As the imaging sensor becomes smaller, reliance on a single impression can become very frustrating for the user.

Many systems using a small area sensor therefore register a single finger using multiple impressions. An initial impression of an image portion always provides completely unique information of the larger image to be reconstituted. However, subsequent impressions have varying usefulness depending upon whether the user provides an impression that partially overlaps and partially presents new image data. The user has difficulties in placing a finger for multiple impressions to ensure only unique partial overlapping data is presented with each impression, particularly over a breadth of an entire fingerprint pattern. It is too easy for a user to provide subsequent images with too much overlap or with too little or no overlap. A user does not know when or if they have provided enough sufficiently overlapping image impressions that map enough of the total fingerprint to provide an end product that provides the user with an easy-to-use verification system.

From a perspective of a user, this can become very challenging as the sensor imaging area decreases. Registration systems do not provide feedback to the user of a status of the finger area mapping process. An accuracy of the registration process is degraded when the set of image portions are unable to produce the needed larger image.

Existing systems employ stitching systems that create a bigger image from ridge map information of the individual image portions. Such a system adds increased complexity to a registration system that, as further explained herein, already includes resources sufficient to map or reconstitute a single image from multiple images provided using multiple impressions of an image source.

A simple system may assume, without checking, that each impression from a multi-impression set of images are all unique qualifying images from a single finger. Systems that rely on a preset number of unqualified image impressions produce a varying quality for the final image to be used in the trusted database. Subsequent verification based upon these registrations results in a wide range of user experience in a quality of the verification process. Some users that are unfamiliar with registration may use different fingers in a registration system designed for a single finger registration process. Such image portions can also degrade the registration process in many different ways.

What is needed is a system and method for efficiently mapping a pattern, such as a fingerprint, from a set of multiple impressions of portions of that pattern.

BRIEF SUMMARY OF THE INVENTION

Disclosed is a system and method for efficiently mapping a pattern from a set of multiple impressions of portions of that pattern. The following summary of the invention is provided to facilitate an understanding of some of the technical features related to pattern mapping from a fingerprint source, and is not intended to be a full description of the present invention. A full appreciation of the various aspects of the invention can be gained by taking the entire specification, claims, drawings, and abstract as a whole. The present invention is applicable to other patterns in addition to fingerprint images, to other systems in addition to registration or verification systems, to systems that do not include a matching engine, and to a range of sensor sizes.

An embodiment of the present invention provides a pattern map from a set of images derived from a pattern.

In some embodiments, the pattern map may be updated in realtime as each image of the set of images is obtained. The pattern map is used to improve a quality of set of images to accurately map over the entire pattern.

In some embodiments, the quality may be improved by providing feedback to the user as each image is obtained. That feedback may provide, for example, information about what portion of the pattern was imaged, how much of the pattern has been matched, whether a received image is a duplicate of another image that has been previously received, among other, or additional, information.

In some embodiments, the feedback may be provided visually through a display graphic presented on, or in association, a device collecting the set of images. In other embodiments, the feedback may be provided by an audio cue in addition to, or in lieu of, a visual indication.

Some embodiments of the present invention may include one or more aspects and some of the disclosed embodiments relate to collection of a trustworthy set of images that may be used to define a trustworthy pattern, such as for registration. For example, assuming a set of images and in some cases, a user or system wants to know whether the user can stop inputting images for registration. One aspect is that an embodiment may evaluate the set of images (whether evaluated collectively as a set or in 'realtime' or 'near realtime' as the user operates a fingerprint sensor) to establish whether a quantity of the images received from the user all relate to a foundation image (in some embodiments this may be referred to as correlated instead of matched. The registration images may remain as discrete images but the system and process may determine that when enough of the images are correlated that they could reconstruct a large enough single pattern map (but this embodiment does not actually require reconstruction of a single pattern map).

Another aspect of some embodiments may be that one way to improve on the collection of data from a user is to provide some feedback to the user of the state of the reconstruction evaluation process. For example when a new image is added into the reconstruction space the user feedback is updated to show the user that they have added new data. An image that is non-matching/non-correlated that is not put in into the reconstruction space (or an image that is a "duplicate" does not add new information and the reconstruction display may not be updated but the user may be provided some indication (e.g., visual or aural). Some feedback may be used to provide the user with an indication when non-matching/duplicate data was received. The user can thus gauge where to contact which part of a finger with the sensor to build out a quality reconstructable image. Disclosed herein is a single "flattened" representation of the set of matching and correlated images in a reconstruction set, in some embodiments that bitmap is primarily intended for feedback to the user.

An embodiment of the present invention may include determining a set of bitmap images that all match or correlate to a foundation image—for example, the bitmap images may remain separate images but are at least "virtually reconstructed"—to build a larger pattern map from the matching/correlating bitmap images (non-matching/non-correlating images are retained and held in reserve as any subsequent image may provide a correlation bridge between an incoming image and the foundation image (and the already matched/correlated images) in which case several images will be added into the reconstruction set. This reconstruction set excludes non-matching/non-correlating bitmap images (they may not match for several reasons—image quality, from a different pattern source (e.g., a different finger), a different part of the same pattern source, or some other factor. Preferably a trusted registration image (which is used a template for later validation for example) thus may only include the images from the reconstruction set which reduces any chance of mis-validation which can happen when spurious non-matching/non-correlating images are in the trusted registration database;

An embodiment of the present invention may include providing feedback (in a number of ways) to the user of the result of this processing described herein. In one case, a realtime (or near realtime) application that responds to each impression of the finger on a fingerprint sensor (as opposed to some offline application that processes an entire set of bitmap images that had been recorded previously), to inform the user of whether the impression has added to the reconstruction set and/or not been added. In one example, this feedback may take the form of a display graphic of a representation of the virtual reconstruction arising from the current set of images in the reconstruction set. As the larger pattern grows, the display graphic may be updated to show various details of the new impression in regards to the previously existing pattern map. In some cases, the display graphic is a representation of the virtual fingerprint as it is being assembled, with a representation updated as to location, rotation, and scale, and other manipulations to have the bitmap image be added into the reconstruction set at the established location, rotation, and scale. The user can visualize where "gaps" exist in the reconstruction image to help guide them in placing a particular portion of their finger onto the sensor. In some cases, it may be desired that the representation have a degraded fidelity so as to not compromise security by providing external access to the images in the trusted registration database. It has enough fidelity to guide the user but not so much as to be useful in validating against the actual trusted images. In some cases, the degraded fidelity may be a simple filled-in block or empty perimeter shape substituted for the added bitmap image(s).

An embodiment of the present invention may include use of a quality metric for processing and/or for providing feedback—it is possible that a system could collect a predetermined number of images to complete registration without regard to how "good" the information was that was received and used in the registration process. This will produce varying and unpredictable levels of security to different users. By having the quality metric on qualified bitmap images of the reconstruction set, one can improve the performance of the registration system by ensuring that what is stored in the registration system is likely to be robust for most users producing a predictable and consistent level of performance for these users. In one example, the quality metric may be a percentage area coverage. The target is to have a certain area of coverage (x square centimeters)—and the virtual reconstruction can be calculated to have a current coverage of y square centimeters)—when the ratio has a predetermined status, e.g., it meets or exceeds the target, the system may determines that images no longer need be collected from the user.

An embodiment of the present invention collects a set of pattern images from multiple impressions of a pattern source. As each image is collected, it is tested against all previously collected images. This testing includes determining an image correlation. When an image matches (by use of a matching or other alignment engine) any previously stored image, it is rotated and translated into position and overlaid on the underlying image(s) already placed into the reconstruction structure. This reconstruction structure may be a memory or other data storage element. The collecting and processing of images continues until "enough" data have been processed. One metric of whether enough image have been processed is to calculate a reconstructed image quality metric. This quality metric sets 100% as a value for an entire pattern (e.g., the fingerprint). As image portions are overlaid into the reconstruction structure, a coverage area is calculated. Dividing this coverage area by an area associated with 100% coverage provides a percentage coverage. When this percentage coverage has a pre-established relationship (e.g., exceeds) a preset threshold, then the quality metric is determined to be sufficiently high to stop the collection and processing. Information derived from the pattern map in the reconstruction structure may be used for the feedback and/or to reconstruct some or all of the pattern. The pattern map helps to ensure that registration information based upon the set of images may then be used for further processing as a high-quality trusted image that is able to contribute to improved performance in subsequent use, such as in a pattern verification system.

Some embodiments may include a user feedback interface in which a coverage graphic derived from the pattern map is presented to the user. As each image is collected, the coverage graphic responds by indicating to the user a placement of the newly added images into the reconstruction structure so the user is able to easily identify what part(s) of the pattern have been imaged and which parts remain. When a newly captured image from an impression is not added into the reconstruction structure (e.g., no match or no correlation with the images included in the pattern map identified in the reconstruction structure) some indication is provided to the user. This helps the user know which impressions are adding to the pattern map and which are not. Also, it helps the user to understand how quickly the pattern map is completing towards the quality metric. The indication may have a visual and/or aural component.

In some implementations, the pattern map may be presented in the coverage graphic. However, for security reasons, embodiments of the present invention include an option to degrade a resolution or other visualization of the coverage graphic so that the user understands how each new impression has contributed to the pattern map without providing a high-resolution image of the pattern (e.g., the fingerprint). For example, a solid rectilinear element may be added into the coverage graphic corresponding to each overlaid image portion added to the pattern map.

Some embodiments provide an ability to use a different alignment engine in support of the matcher, or in lieu of the matcher, in establishing match, correlation, and/or alignment. An environment and application help to determine an appropriate alignment system to be used. Factors influencing the choice depend not only on the available storage and processing resources available to the system, but also to the resolution and imaging area of the sensor as well as pattern source size. There are many parameters that may be implemented—for example a fingerprint image may be about 15×24 mm and be imaged from multiple impressions taken with a sensor having a 4×4 mm imaging area and 15 pixels/mm. Different values are possible for these parameters, the values impacting the amount of data to be processed by the alignment engine. As the total amount of data decreases, more direct comparison and trial-and-error testing may be used. For example, phase correlation techniques for comparing various orientations and relative translations of a first image against a second image may be sufficient such that the matcher is not needed. As the total amount of data increases, more higher-level processing is useful, such as use of a matching engine that establishes and compares features of interest between the test images. An alignment engine may employ a hybrid solution having multiple phases, such as first schema for general placement and a second schema for precise placement.

A machine-implemented pattern registration method for recording a test pattern into a memory, includes a) receiving a series of images in a serial order, each the particular image of the series of images including a portion of a particular pattern; b) selecting an image of the series images as a foundation image; c) recording the foundation image into a reconstruction structure as a pattern map wherein the pattern map includes a pattern map pattern having a foundation portion matching the particular pattern of the foundation image; d) recording the image into an image storage; e) producing a set of matching images by testing the portion of the particular pattern of each image of the series of images subsequent to the image for a match against the portion of the particular pattern of each the image recorded into the image storage wherein the set of matching images includes a subset of the series of images with the match equal to TRUE and wherein each image having the match equal to FALSE is recorded into the image storage; f) producing a set of correlated images by testing the portion of the particular pattern of each the image of the set of matching images for a correlation with the pattern map wherein the set of correlated images have the correlation equal to TRUE and wherein a non-correlated subset of the set of matching images having the correlation equal to FALSE are recorded into the image storage; and g) recording the set of correlated images into the reconstruction structure to add them into the pattern map to produce a reconstructed pattern by aligning each the portion of the particular pattern of each the image of the set of correlated images with the pattern map pattern and using the reconstructed pattern as the pattern map; h) repeating a set of steps including steps e)-g) until a termination event occurs; and i) recording the reconstructed pattern into the memory as the test pattern.

A machine-implemented method for reconstructing a pattern map from a set of bitmap images, each bitmap image including a portion of a pattern from a pattern source, the method including a) selecting one of the bitmap images as a foundation image having a foundation pattern portion of a foundation pattern source; and thereafter b) processing the set of bitmap images to determine a reconstruction set of bitmap images, the portion of the pattern of each the bitmap image of the reconstruction set matched or correlated to the foundation pattern portion; wherein the reconstruction set of bitmap images excludes each bitmap image from the set of bitmap images with its portion of the pattern not matched or not correlated to the foundation pattern portion.

An apparatus for recording a test pattern into a memory, including a pattern collector producing one or more of the digital representations; and a processing system, coupled to the pattern collector, including a processor and a memory coupled to the processor, the memory storing a plurality of computer executable instructions wherein the processor executes the plurality of computer executable instructions to perform a method, including a) receiving a series of images in a serial order, each the particular image of the series of images including a portion of a particular pattern; b) selecting an image of the series images as a foundation image; c) recording the foundation image into a reconstruction structure as a pattern map wherein the pattern map includes a pattern map pattern having a foundation portion matching the particular pattern of the foundation image; d) recording the image into an image storage; e) producing a set of matching images by testing the portion of the particular pattern of each image of the series of images subsequent to the image for a match against the portion of the particular pattern of each the image recorded into the image storage wherein the set of matching images includes a subset of the series of images with the match equal to TRUE and wherein each image having the match equal to FALSE is recorded into the image storage; f) producing a set of correlated images by testing the portion of the particular pattern of each the image of the set of matching images for a correlation with the pattern map wherein the set of correlated images have the correlation equal to TRUE and wherein a non-correlated subset of the set of matching images having the correlation equal to FALSE are recorded into the image storage; and g) recording the set of correlated images into the reconstruction structure to add them into the pattern map to produce a reconstructed pattern by aligning each the portion of the particular pattern of each the image of the set of correlated images with the pattern map pattern and using the reconstructed pattern as the pattern map; h) repeating a set of steps including steps e)-g) until a termination event occurs; and i) recording the reconstructed pattern into the memory as the test pattern.

An apparatus for reconstructing a pattern map from a set of bitmap images, each bitmap image including a portion of a pattern from a pattern source, including a pattern collector producing one or more of the digital representations; and a processing system, coupled to the pattern collector, including a processor and a memory coupled to the processor, the memory storing a plurality of computer executable instructions wherein the processor executes the plurality of computer executable instructions to perform a method, including a) selecting one of the bitmap images as a foundation image having a foundation pattern portion of a foundation pattern source; and thereafter b) processing the set of bitmap images to determine a reconstruction set of bitmap images, the portion of the pattern of each the bitmap image of the reconstruction set matched or correlated to the foundation pattern portion; wherein the reconstruction set of bitmap images excludes each bitmap image from the set of bitmap images with its portion of the pattern not matched or not correlated to the foundation pattern portion.

A non-transitory computer readable medium with computer executable instructions stored thereon executed by a processor to perform the method of recording a test pattern into a memory, the method including a) receiving a series of images in a serial order, each the particular image of the series of images including a portion of a particular pattern; b) selecting an image of the series images as a foundation image; c) recording the foundation image into a reconstruction structure as a pattern map wherein the pattern map includes a pattern map pattern having a foundation portion matching the particular pattern of the foundation image; d) recording the image into an image storage; e) producing a set of matching images by testing the portion of the particular pattern of each image of the series of images subsequent to the image for a match against the portion of the particular pattern of each the image recorded into the image storage wherein the set of matching images includes a subset of the series of images with the match equal to TRUE and wherein each image having the match equal to FALSE is recorded into the image storage; f) producing a set of correlated images by testing the portion of the particular pattern of each the image of the set of matching images for a correlation with the pattern map wherein the set of correlated images have the correlation equal to TRUE and wherein a non-correlated subset of the set of matching images having the correlation equal to FALSE are recorded into the image storage; and g) recording the set of correlated images into the reconstruction structure to add them into the pattern map to produce a reconstructed pattern by aligning each the portion of the particular pattern of each the image of the set of correlated images with the pattern map pattern and using the reconstructed pattern as the pattern map; h) repeating a set of steps including steps e)-g) until a termination event occurs; and i) recording the reconstructed pattern into the memory as the test pattern.

A non-transitory computer readable medium with computer executable instructions stored thereon executed by a processor to perform the method of reconstructing a pattern map from a set of bitmap images, each bitmap image including a portion of a pattern from a pattern source, the method including a) selecting one of the bitmap images as a foundation image having a foundation pattern portion of a foundation pattern source; and thereafter b) processing the set of bitmap images to determine a reconstruction set of bitmap images, the portion of the pattern of each the bitmap image of the reconstruction set matched or correlated to the foundation pattern portion; wherein the reconstruction set of bitmap images excludes each bitmap image from the set of bitmap images with its portion of the pattern not matched or not correlated to the foundation pattern portion.

Embodiments of the present invention may feature either one or two aspects of the present invention in improving a pattern registration process. One aspect provides feedback, which may be in realtime contemporaneous with sampling a pattern, to a user to improve the user experience in developing a pattern map. As the pattern is sampled, location information of the sample in the context of the pattern is provided to the user. This makes development of a quality pattern more efficient. Another aspect relates to improvement in the quality of the pattern map itself. Registration systems and methods may use the set of images used in the pattern map in subsequent processing. For example, in a fingerprint registration system for developing trusted patterns for storage in a trusted environment, the set of images making up the pattern map are used to make an encrypted template that is stored in a trusted memory rather than the images themselves. Such encrypted templates and other uses of the images of the pattern map are improved by having a sufficiently large portion of the source pattern accurately mapped. In some ways these aspects may be independent though related and any embodiment may implement a solution having one or both aspects.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 3 illustrates an initial mapping state presenting a first image portion;

FIG. 4 illustrates a second mapping state presenting a second image portion overlaid on the first image portion;

FIG. 5 illustrates a final mapping state presenting an Nth image portion overlaid on the previous image portion overlays.

DETAILED DESCRIPTION OF THE INVENTION

Figure 1:
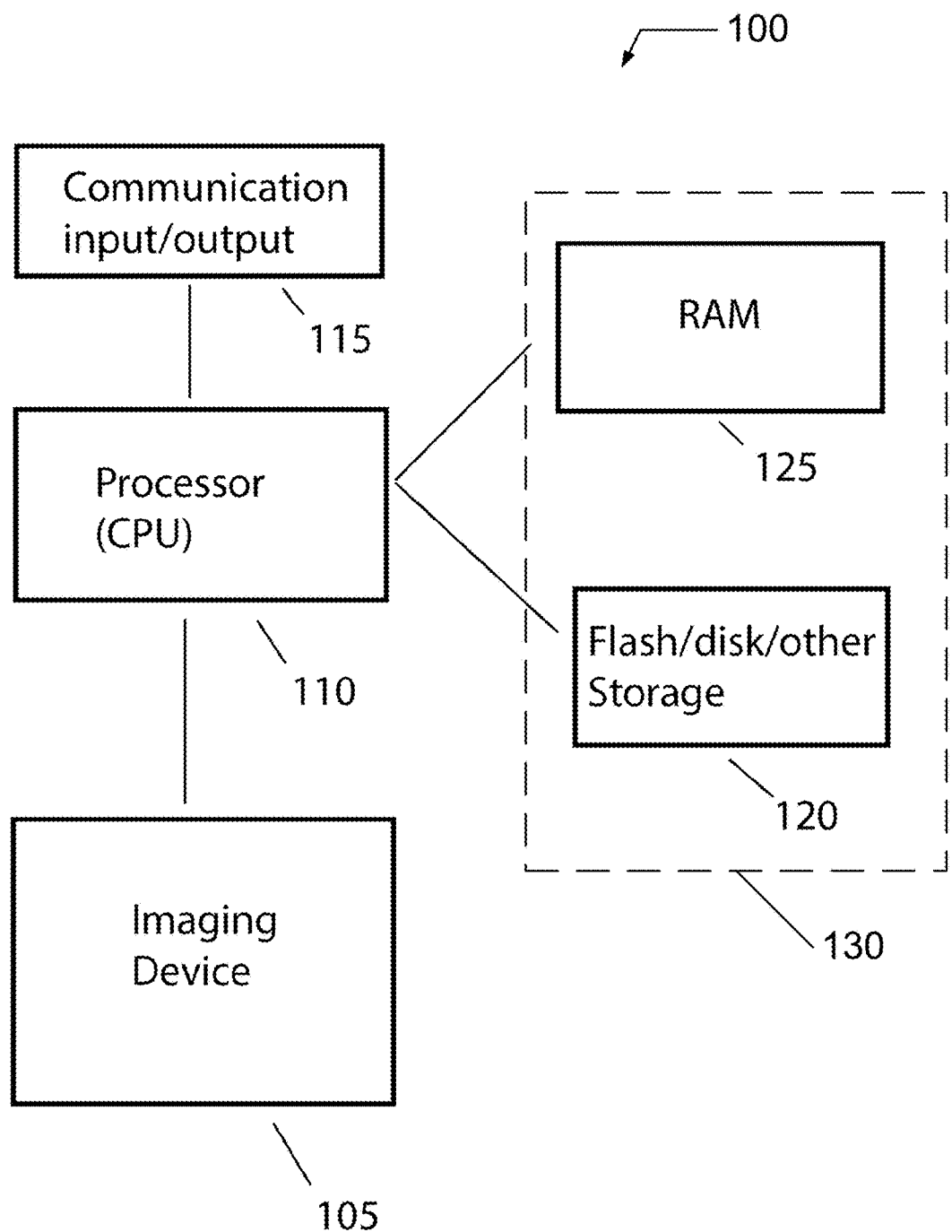
FIG. 1 illustrates a block schematic diagram of an embodiment for a pattern verification system.

Embodiments of the present invention provide a system and method for efficiently mapping a pattern, such as a fingerprint, from a set of multiple impressions of portions of that pattern. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "fingerprint" means a map of contrasting amplitude elements from a pattern source. As such, a ridge/furrow pattern on a human finger is included as a fingerprint. Additionally, zebra stripe patterns, retinal vein patterns, or other collections of contrasting amplitude elements having a set of a plurality of sufficiently long succession of similarly contrasted elements.

As used herein, the terms "match," "matching," and "matches" refer to a conclusion of a comparison of a first pattern (e.g., a first image portion of a first impression from a sensor) against a second pattern (e.g., a second image portion of a second impression from the sensor) that means that a pattern source used in the first impression is the same pattern source, within a sufficient confidence interval appropriate to the application, used in the second impression. A match does not require 100% commonality of features between the first and second patterns. One hundred percent, and nearly 100% (for example 95% commonality—depending upon application), commonality is referred to as a duplicate image. This results when the user places the same portion of the same finger on the sensor from two or more impressions. Sometimes a match is a determination from a matcher process or matcher engine, which can have a particular special meaning. Some embodiments of the present invention include just such a matcher process. However, the present invention is not constrained to determining matches in this fashion; the present invention includes use of an alignment engine for evaluating the condition of a match or a non-match between comparisons of a set of patterns.

As used herein, the terms "correlate," "correlating," and "correlated" refer to a conclusion of a comparison of a first pattern (e.g., a first image portion of a first impression from a sensor) against a second pattern (e.g., a second image portion of a second impression from the sensor) that means that a pattern source used in the first impression is the same pattern source, within a sufficient confidence interval appropriate to the application, used in the second impression without a match between the first pattern and the second pattern. Correlation is found by matching intermediate patterns that provide a bridge between the first pattern and the second pattern. For example, a second pattern may not match the first pattern, but may match a third pattern, with the third pattern matching the first pattern. Correlation may be found by one or more intermediate matches between the second pattern and the first pattern.

As used herein, the terms "near realtime" refers to a practicality of a time delay introduced, by automated data processing or data transmission, between an occurrence of an event of receiving a pattern impression from application of a pattern source to a pattern impressioner (e.g., an imager to create a bitmap image of a portion of a pattern associated the pattern source) and the subsequent processing of data for that pattern impression (e.g., a bitmap image), such as for display, feedback, or control purposes. Depending upon a processing speed, it may be possible to make multiple pattern impressions before a first pattern impression is processed. Some embodiments of the present invention process serial pattern impressions from a user in realtime or near realtime which may be considered equivalent when the processing delay is imperceptible to a user. For realtime, and near realtime embodiments, it is considered that pattern impressions are taken and processed serially, that is an impression and processing/feedback is provided before a next following pattern impression is processed.

FIG. 1 illustrates a block schematic diagram of an embodiment for a pattern registration system 100. System 100 includes an imaging device 105, a processor 110, an input/output (I/O) system 115, a nonvolatile memory 120 and a RAM memory 125, with memory 120 and memory 125 collectively defining a memory system 130. System 100 is described, in the disclosed embodiment, as a fingerprint registration system that may be used as a pattern (e.g., fingerprint) verification system. In a fingerprint verification system, the system attempts to measure a correspondence between a pair of fingerprints (one-on-one) in order to establish, within some level of confidence, whether one pattern source of one fingerprint is the same or sufficiently close as a pattern source of the other fingerprint. This is contrasted with an identification system that determines which pattern source generated a particular fingerprint. A verification system may be used as an identification system when a decrease in power/speed is acceptable, given fixed resources. A verification system performs better as the quality of the registered images improves.

System 100 may function as a basic computer in implementing the present invention for accessing and processing fingerprints, fingerprint images, and sets of curves derived from a fingerprint as further described below. Processor 110 may include one or more central processing units (CPUs), selected from one or more of an x86, x64, ARM, or the like, architectures, connected to various other components, such as by a system bus.

Imaging device 105 produces an image of a fingerprint; either directly (e.g., it is a sensor or imager or impressioner for a pattern source or an artifact from a pattern source) or it accesses a data structure or memory to obtain the image sometimes referred to herein as a pattern collector for producing a digital representation of the pattern from the pattern source or artifact from the pattern source. The image may be of all or a portion of an entire fingerprint. Sometimes a portion of a fingerprint image may appear to be a set of discrete curves. System 100 is a computing system (e.g., an embedded computing system, a general purpose computing system, a special purpose computing system, combinations thereof, including stored program computing platform with a processor and a coupled memory storing executable instructions) having a large number of suitable implementations for accessing and processing resources fingerprints, fingerprint images, portions of fingerprint images, and sets of curves derived from a fingerprint. Sensors that may be used with system 100 include charge-coupled devices (CCD), complementary metal oxide semiconductor (CMOS), capacitive, thermal, optical, electro-optical, RF modulation, acoustic, or other image sensing devices, such as those available from a wide range of manufacturers including IDEX ASA, Fujitsu, Atmel, Apple, Synaptics, Infineon, Sony, Integrated Biometrics, and Fingerprint Cards for example. Image arrays may be relatively small (e.g., 50×50 pixels, 128×128 pixels to a CIF size of 352×288 pixels or larger), each pixel having a pixel depth of but not limited to eight bits. System 100 uses a fingerprint image produced from device 105. In some cases, device 105 may preprocess images, such as performing image keystone corrections (a geometric correction used to account for optical distortions associated with optical/prism based systems when returning an image size proportionate to fingerprint size or image reconstruction to assemble an image taken in bands as a finger is 'swiped' across the sensor.

An operating system runs on processor 110, providing control and coordinating the functions of the various components of the system. The operating system may be one of the commercially available operating systems such as Microsoft (e.g., windows), Apple (e.g., IOS or Mac OS X), Google (e.g., Chrome or Android), as well as UNIX and AIX operating systems, though some embodiments may use a custom control for providing minimal, tailored functions. Custom programs, controlled by the system, include sets of instructions executable on processor 110 that are moved into and out of memory. These sets of instructions, when executed by processor 110, perform the methods and automated machine-implemented processes described herein. Device 105, I/O communication system 115, and memory system 130 are each coupled to processor 110 via a bus and with memory system 130 including a Basic Input/Output System (BIOS) for controlling the basic system functions.

I/O system 115 interconnects system 100 with outside devices or networks, enabling the system to communicate with other such systems over a communications system (e.g., directly wired, Local Area Network (LAN) or Wide Area Network (WAN), which includes, for example, the Internet, the WEB, intranets, extranets, and other public and private networks, wired, optical, or wireless). The terms associated with the communications system are meant to be generally interchangeable and are so used in the present description of the distribution network. I/O devices are also connected to the system bus via I/O system 115. A keyboard, a pointing device (e.g., mouse, trackball or other device) and a display or indicator may be interconnected to system 100 through I/O system 115. It is through such input devices that the user may interactively relate to the programs for manipulating the resources, images, subsystems, processes and system according to the present invention. By using the aforementioned I/O devices, a user is capable of inputting information to the system through the keyboard or mouse and receiving output information from the system. The system may contain a removable memory component for transferring data, for example images, maps, instructions, or programs.

In use, system 100 processes a set of pattern images from a pattern source (e.g., a fingerprint) to reconstruct an image of the pattern source. Optionally, system 100 provides the user with feedback regarding a status and/or quality of the image reconstruction to aid in realtime impression gathering.

I/O system 115 may optionally include a display or other output or visualization system that supports a visualization graphic of a quality of image reconstruction. For example, as the user adds a new image impression to the set of pattern images, each time the reconstructed image is enhanced by the addition of the new pattern image, the visualization graphic is updated to illustrate the newly added information. For security, it may be desirable that the visualization graphic derived from the reconstruction image is degraded in some fashion (e.g., resolution) so that a true copy of the fingerprint is not on the display. Similarly, any impression that is not immediately added to the reconstruction image may result in some other indication (e.g., tone) or temporary visual element on the display signaling that the pattern image from the latest impression was not added.

During use, any particular pattern image may serve as an intermediate bridging image that creates a correlation chain between images of the reconstructed image and stored images. When this happens, multiple images may be added into the reconstruction image, and the visualization graphic may indicate that a plurality of images, including previously stored and unmatched images, have been subsequently added to the reconstruction image.

It is not uncommon that a first image taken with an imager is degraded in some fashion (e.g., smudged or distorted). Subsequent pattern images may be unable to match this initial foundation image. System 100 provides that a new foundation image may be substituted for the initial image to avoid this condition. This substitution results when enough of the stored but unmatching/uncorrelated (to the foundation image) images are better correlated to an alternate stored image. In such a case, the foundation image is replaced by a different image and then the reconstructed image is rebuilt based on matches and correlations of the stored images to the new foundation image. Any previously placed but now non-matching images are removed from the reconstruction image.

Figure 2:
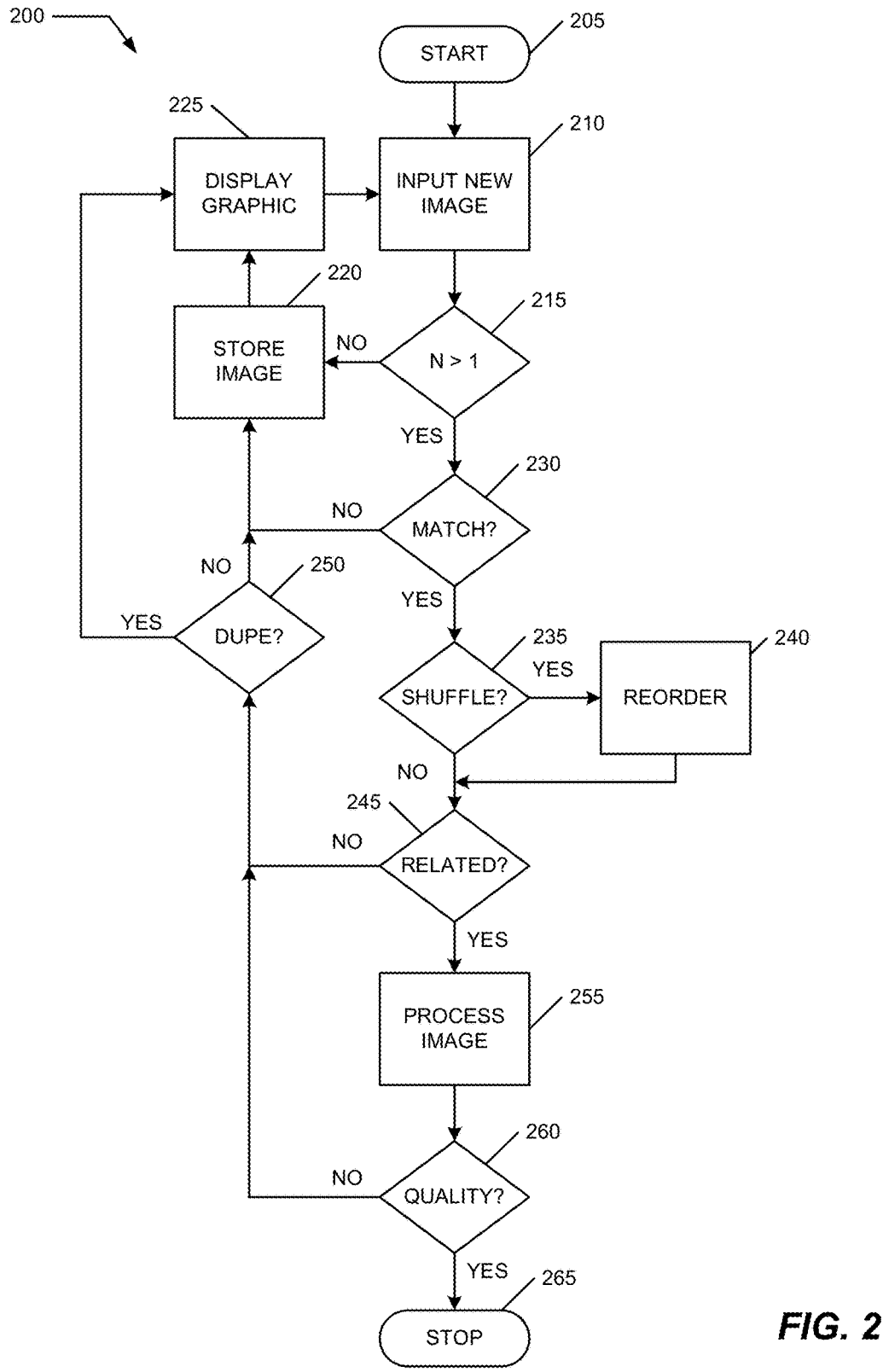
FIG. 2 illustrates a flow diagram of an embodiment for a pattern mapping process used in a pattern verification system.

FIG. 2 illustrates a flow diagram of an embodiment for a pattern mapping process 200, such as may be used in a pattern verification system. Process 200, executed by system 100 for example, includes a series of steps 205-265. Process 200 begins at start step 205 which includes a realtime implementation with step 205 accessing a pattern imager wherein a set of pattern images are received in sequence, such as from serial impressions of a finger on a fingerprint sensor. Alternatively, there may be a previously constructed storage of the set of pattern images, and start 205 accesses the storage. Start 205 initializes process 200, clears a reconstruction structure where the pattern will be mapped, and initializes a counter.

A step 210 follows start step 205 to serially access each pattern image. The counter is incremented with each input image. For the first image, the counter has N=1. A test at step 215 tests whether system 100 is processing an initial foundation image (e.g., N=1) or a subsequent image (N>1). When processing the initial image (e.g., N not greater than 1) the test is FALSE, process 200 branches to step 220 from the test at step 215. Step 220 stores the image into a memory of system 100 and then proceeds to optional step 225 to update the display graphic to the user of the status of the pattern map in the reconstruction structure. The display graphic is updated at this point to simply present the initial foundation image as the current pattern map (or a degraded image derived from the initial foundation image is presented). After step 225, process 200 returns to step 210 to input a new image (which increments the counter). Thereafter process 200 again performs the test at step 215 but the test is now TRUE and process 200 then performs another test at step 230.

The test at step 230 establishes whether the new image matches any other stored image, whether the matched image(s) is/are part of the pattern map. For N=2, the second image is compared against the first image for a match. For N=3, the third is imaged is compared against the second image and against the first image for a match. When the test at step 230 is FALSE and the new image does not match any other image, process 200 branches to step 220 and stores the new image. Thereafter the display graphic is updated with an indication associated with a receipt of a non-matching image. There are four possible results from the test at step 230: no match, or one of three different types of match. These three include a match to the initial foundation image, a match to one or more images correlated to the foundation image (some of which may be part of the current pattern map), or a match to one or more stored images that are not correlated to the foundation image (none of which are part of the current pattern map).

When the test at step 230 is TRUE and the new image matches at least one other image, process 200 performs a test at step 235 to determine whether the foundation image needs to be changed. The process of changing the foundation image is referred to as shuffling in which the stored image having the greatest number of correlated images is substituted for the current foundation images and the stored images correlated to the new foundation image are reordered and placed into the reconstruction structure to become part of a new pattern map. The test at step 235 determines whether there exists an image portion in memory that would offer a better foundation image, responsive to a metric (e.g., number of correlated images or pattern map quality metric) as compared to the current foundation image and its corresponding metric. When the test at step 235 is TRUE (and there is a better alternative foundation image), process 200 branches to step 240 and reorders the images of the pattern map including substituting a new foundation image and adding stored image portions correlated to the new foundation image into the pattern map.

After reordering step 240 is complete, or when the test at step 235 is FALSE, process 200 advances to step 245 to test whether the new image portion is correlated to the current foundation image. When the test at step 245 is FALSE, process 200 branches to a step 250 to test whether the new image is a duplicate image. When the test at step 250 is FALSE and is not a duplicate, process 200 stores the image at step 220 (and then provides an indication on the display graphic at step 225 that the new image was not a non-duplicate correlated image). When the test at step 250 is TRUE (and the new image is a non-correlated duplicate image) then process 200 advances directly to the display graphic step 225 and provides any suitable indication that the most recent image was a non-correlated duplicate image.

When the test at step 245 is TRUE (and the new image is correlated to the current foundation image) process 200 advances to step 255 to process the new image. Process image at step 255 rotates and/or translates the new image into its appropriate location vis-à-vis the one or more images it matches that are part of the current pattern map. Addition of the new image into the pattern map at the location and orientation it matches the other image(s) that is/are part of the current pattern map changes the pattern map. The correlated image portion is added into the reconstruction structure and forms a part of the new pattern map. At this step 255, the new image matches an image that is part of the current pattern map. When the new image is not a duplicate, new image information is present and the pattern map is appropriately enlarged by the amount of the new non-overlapping pattern information. The enlarged pattern map covers an increased area. In this embodiment, this increased area is used in the next step, step 260, to test a quality of the pattern map. A quality metric is established, for example, by the covered area as a percentage of the total possible area. When this quality metric indicates that the reconstructed image does not have sufficient quality, process 200 branches to step 250 to test whether the newly added image was a duplicate. The nature of certain patterns, such as fingerprints, and the definition of what a duplicate image is for any particular embodiment, may lead to a result that a duplicate image may still provide some new pattern information that was not part of the current pattern map.

When the test at step 260 is TRUE, process 200 branches to step 265 and stops, with any post-process update, reporting, storage, or image manipulation performed. For example, the display graphic may be presented to the user with a final pattern map, a success message, a blending of the images of the pattern map to produce a reconstructed image (as further explained below with respect to FIG. 6), or combination thereof.

Figure 3:
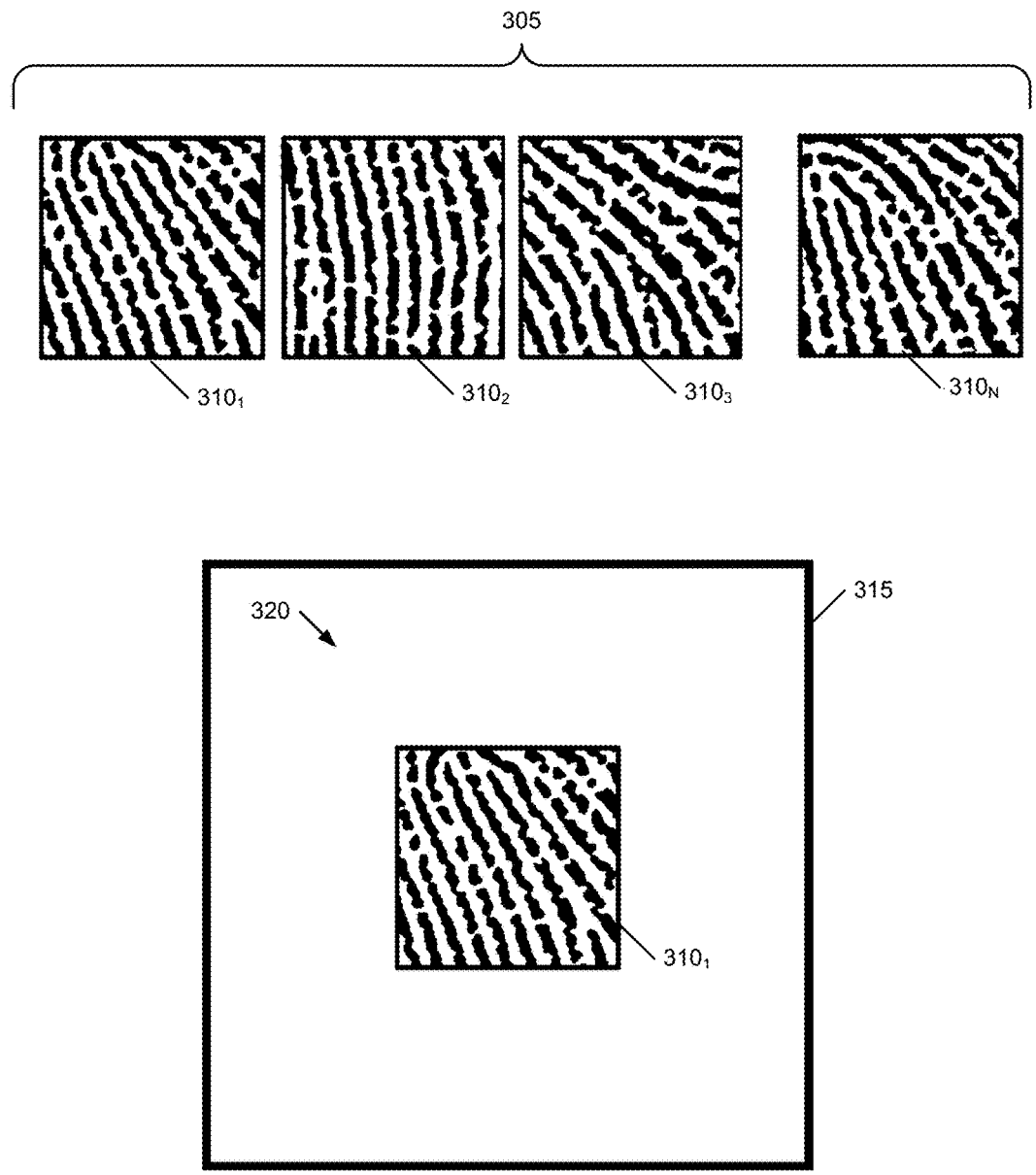
FIG. 3-FIG. 5 illustrate a sequence of pattern mapping representations from a set of N pattern portions.
Figure 4:
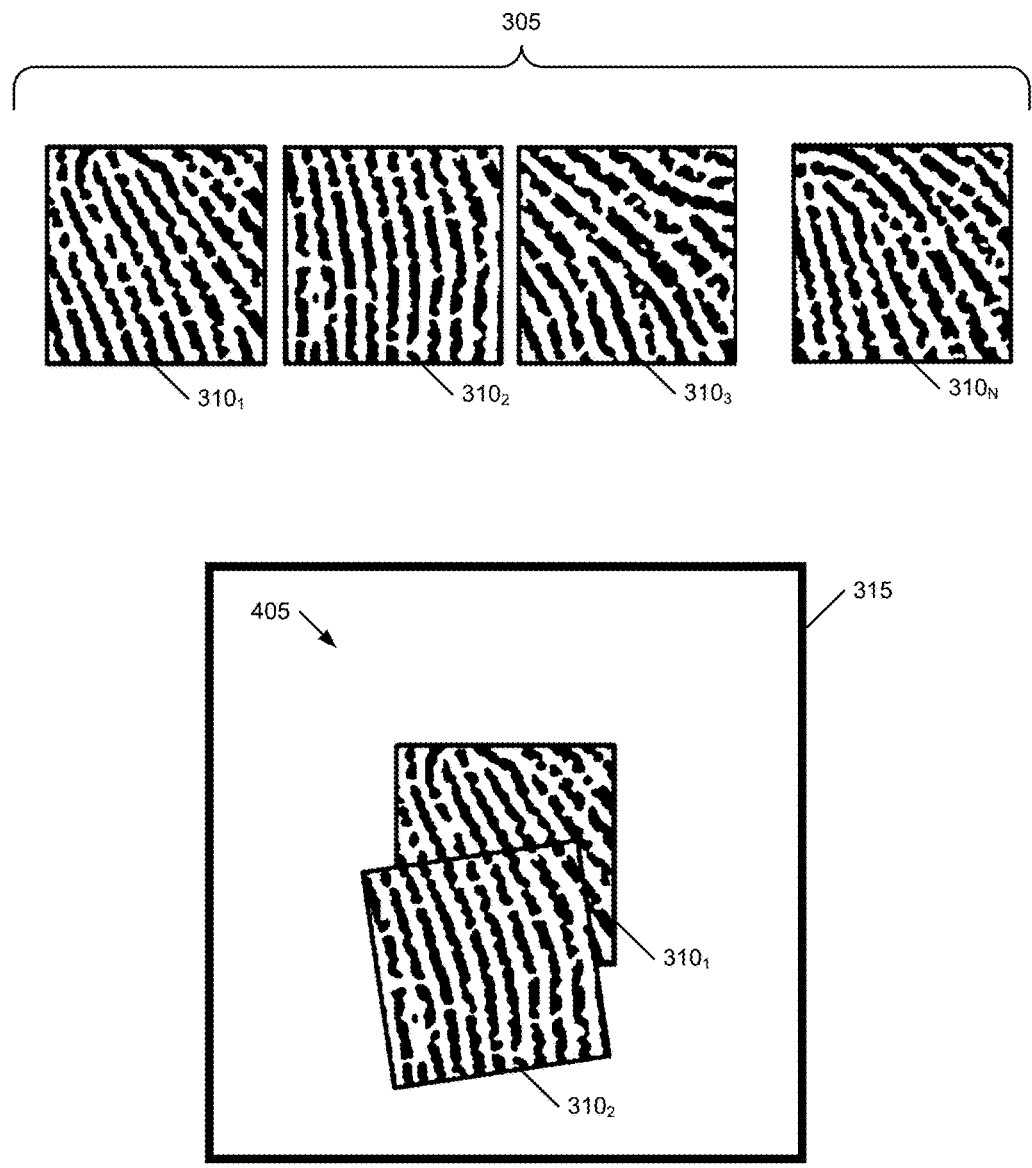
Figure 5:
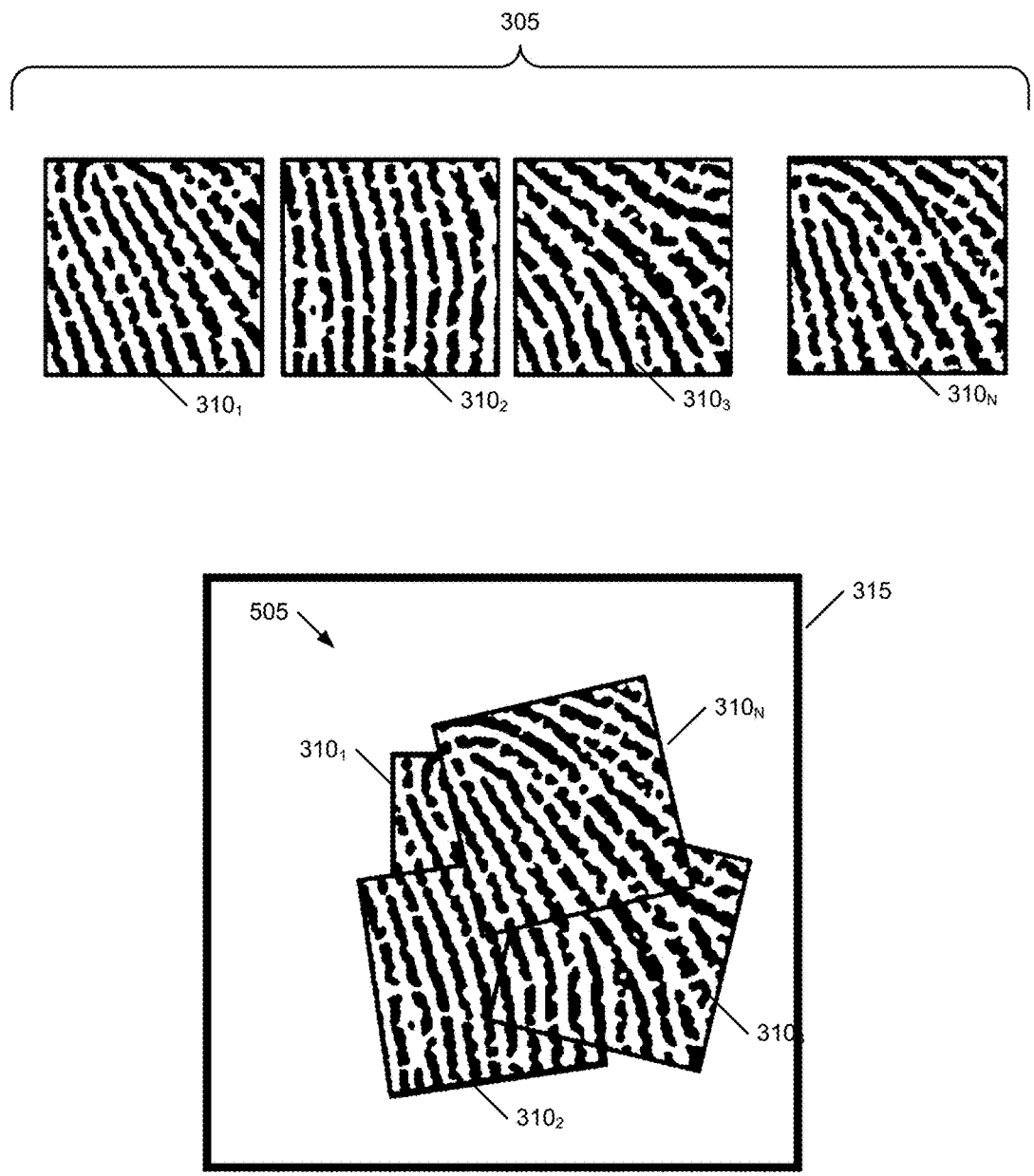

FIG. 3-FIG. 5 illustrate a sequence of pattern map representations from a set of N pattern portions. FIG. 3 illustrates an initial state of the pattern map presenting a first image portion, FIG. 4 illustrates an intermediate state of the pattern map presenting a second image portion overlaid on the first image portion, and FIG. 5 illustrates a final state of the pattern map presenting an Nth image portion overlaid on the previous image portion overlays.

FIG. 3 includes a set 305 of image portions $310_x$, x=1 to N. The image portions represent the result of an impression taken from an imager, such as a portion of a fingerprint sampled from a small fingerprint scanner. Also included in FIG. 3 is a representation of a reconstruction structure 315, such as a section of memory of system 100, which contains a pattern map 320 as it is created. Initially reconstruction structure 315 contains image portion 3101 as pattern map 320 because image portion 3101 represents the initial foundation image. Not illustrated in this sequence, but as noted herein, during processing any current foundation image, including the initial foundation image, may be changed which will produce a different pattern map based upon the images correlated to the new current foundation image.

FIG. 4 illustrates translation and rotation of second image portion 3102 after process 200 has processed it and determined that it is a non-duplicate matching image. Reconstruction structure 315 includes an expanded intermediate pattern map 405. Images continue to be added into reconstruction structure 315 until the quality metric or other test determines that the collection of images contributing to the current pattern map meets the quality metric.

FIG. 5 illustrates translation and rotation of the remaining matching image portions $310_x$ into a final pattern map 505. A quality metric may be represented as a coverage percentage of pattern map 505 of the area bounded by a representation of the reconstruction structure 315. In some implementations of system 100 and process 200, it may be assumed that when pattern map 505 includes at least a particular number of correlated images from the foundation image (which may be different from the initial foundation image as a result of shuffling). That is, when pattern map 505 includes a minimum number of correlated images, it may be that the quality metric is satisfied. Other metrics may be used.

Figure 6:
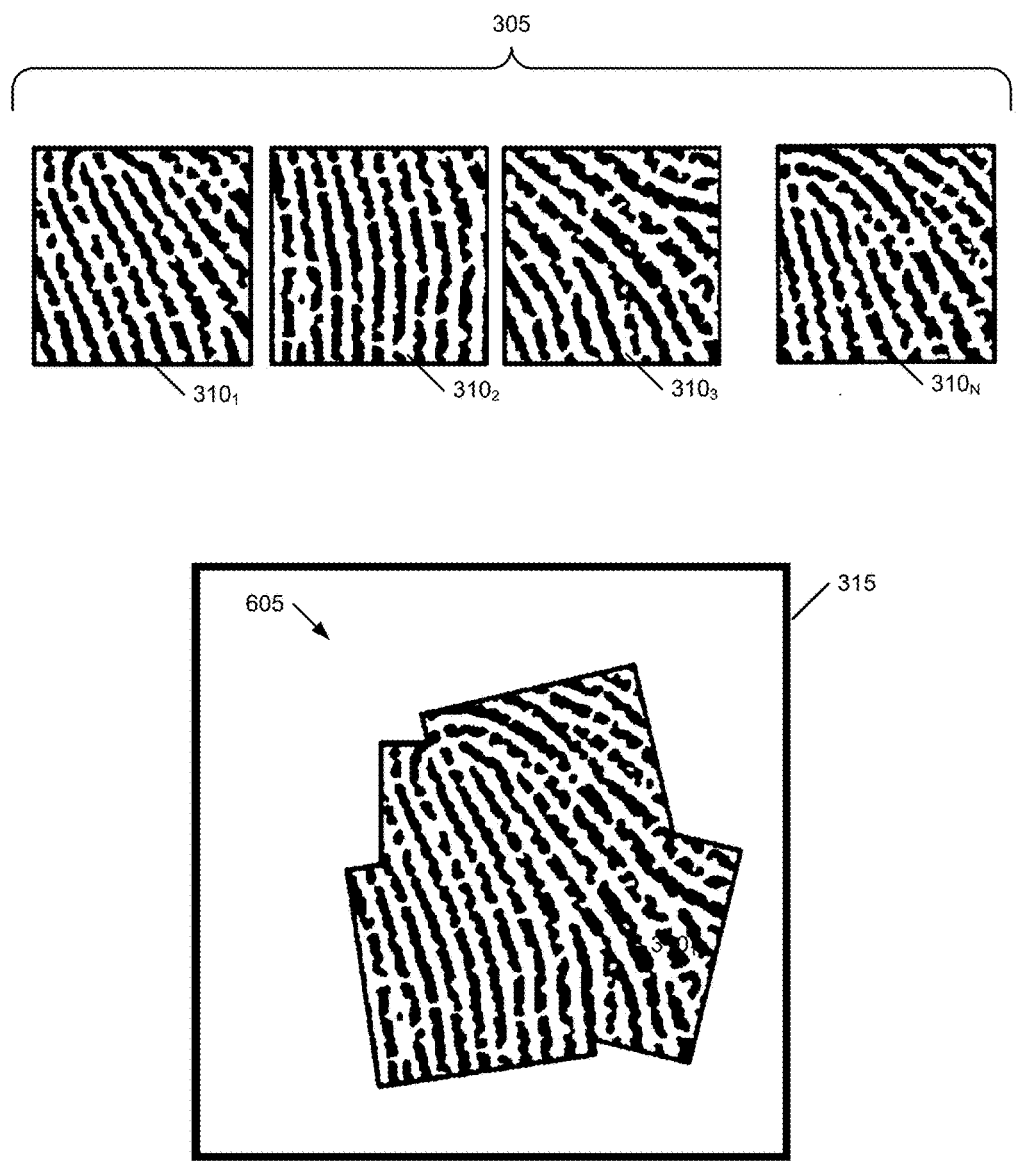
FIG. 6 illustrates a final composite image resulting from a blending of the final mapping state illustrated in FIG. 5.

FIG. 6 illustrates a final blended image 605 in reconstruction structure 315 resulting from a blending of final pattern map 505 illustrated in FIG. 5. In FIG. 3-FIG. 5, the pattern map is represented as an overlay of a set of discrete matching images correlated to the current foundation image. The images remain distinct though they are virtually overlaid. For some processes, it may be advantageous to maintain the images making up the pattern map in discrete form, and in other cases, a blending of the images may be desired to produce a single image. For example, in an embodiment using a fingerprint registration system, the reconstructed image in the reconstruction structure will be used as a trusted image. For many systems, it may be not be desirable to store the reconstructed image as a bitmap in a trusted memory. Encryption may be desired, and there may be advantages to alternative representations (e.g., templates) derived from the reconstructed image. When the images are not blended, such as illustrated in FIG. 5, there may be multiple mini-templates derived from the individual images that are part of the reconstructed image. However, when the images are blended as illustrated in FIG. 6, a single template may be formed. Implementation details may determine whether one approach of the other is appropriate and/or beneficial.

Moreover, those skilled in the art will appreciate that the above described methods may be practiced using any one or a combination of computer processing system configurations, including, but not limited to, single and multi-processor systems, hand-held devices, programmable consumer electronics, mini-computers, or mainframe computers. The above described methods may also be practiced in distributed computing environments where tasks are performed by servers or other processing devices that are linked through a one or more data communications networks. In a distributed computing environment, program modules may be located in both local and remote computer storage media including memory storage devices.

Also, an article of manufacture for use with a computer processor, such as a CD, pre-recorded disk or other equivalent devices, could include a computer program storage medium and program mechanisms recorded thereon for directing the computer processor to facilitate the implementation and practice of the above described methods. Such devices and articles of manufacture also fall within the spirit and scope of the present invention.

The invention can be implemented in numerous ways, including for example as a method (including a computer-implemented method), a system (including a computer processing system, general purpose, special purpose, hybrid, embedded, and the like), an apparatus, a computer readable medium, a computer program product, a graphical user interface, a web portal, or a data structure tangibly fixed in a computer readable memory. Several embodiments of the present invention are discussed herein. The appended drawings illustrate only typical embodiments of the present invention and therefore are not to be considered limiting of its scope and breadth. The system, methods, and computer-program products have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

System 100 includes a computer program product or software that is stored on or in a non-transitory processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. As will be described more fully herein, the software can include a plurality of modules for performing system tasks such as performing the methods previously described herein. A processor interprets instructions to execute the software, as well as, generates automatic instructions to execute software for system responsive to predetermined conditions. Instructions from both the user interface and the software are processed by the processor for operation of system 100. In some embodiments, a plurality of processors can be utilized such that system operations can be executed more rapidly.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A machine-implemented method for producing a final pattern map from a set of bitmap images, each bitmap image including a portion of a pattern from a pattern source, the method comprising:
   a) selecting, using a processor coupled to a matching engine included in a digital pattern matching system having said processor executing instructions retrieved from a memory, one of the bitmap images as a foundation image having a foundation pattern portion of a foundation pattern source, wherein the foundation image is the image from the set of bitmap images that has the greatest number of correlations with the other images of the set of bitmap images; and thereafter
   b) processing, using said matching engine, the set of bitmap images to determine a reconstruction set of bitmap images, the portion of the pattern of each said bitmap image of said reconstruction set matched or correlated to said foundation pattern portion;
      wherein said reconstruction set of bitmap images excludes each bitmap image from the set of bitmap images with its portion of the pattern not matched or not correlated to said foundation pattern portion.

2. The method of claim 1 further comprising:
c) producing, using said processor, a reconstructed pattern map from said reconstruction set of bitmap images.

3. The method of claim 2 wherein said reconstructed pattern map includes a larger portion of the pattern from the pattern source as compared to the portion from any individual bitmap image.

4. The method of claim 2 further comprising:
d) presenting, using said processor, said reconstructed pattern map on a display.

5. The method of claim 1 wherein said step b) further includes:
b1) selecting serially, using said processor, each bitmap image of the set of bitmap images as a next bitmap image;
b2) evaluating, using said processor, each next bitmap image whether its portion of the pattern is matched or correlated to said foundation pattern portion;
b3) adding, using said processor, said next bitmap image to said reconstruction set when matched or correlated;
b4) adding, using said processor, said next bitmap image to a reserve set of bitmap images when not matched or not correlated; and
b5) repeating, using a different one bitmap image from one of the set of bitmap images or from said reserve set of bitmap images as said next bitmap image and said processor, a set of steps including steps b2)-b4) until a termination event occurs.

6. The method of claim 5 further comprising:
c) producing, using said processor, a reconstructed pattern map from said reconstruction set of bitmap images; and
d) creating, using said processor, a quality metric for said pattern map;
wherein said termination event includes an evaluation of said quality metric against a predetermined quality metric target.

7. The method of claim 6 wherein said quality metric includes a reconstructed area of the pattern map and wherein said quality metric target includes a target area for said reconstructed area.

8. The method of claim 6 wherein step b) further comprises:
b6) determining, using the processor, a quality metric for the reconstructed pattern map;
b7) comparing, using said processor, said quality metric against a predetermined quality metric target; and
b8) setting, using said processor, said termination event when quality metric has a predetermined relationship to said predetermined quality metric target.

9. The method of claim 8 wherein said quality metric includes a reconstructed area of the pattern map and wherein said quality metric target includes a target area for said reconstructed area.

10. The method of claim 1 wherein said step b) further includes:
b1) producing, using said processor, a reconstructed pattern map from said reconstruction set of bitmap images; and
b2) creating, using said processor, a quality metric for said pattern map.

11. The method of claim 10 further comprising:
c) providing, using said processor, an external indication of said quality metric during said step b).

12. The method of claim 1 wherein the set of bitmap images is produced from a series of impressions from a pattern source producing a series of bitmap image impressions, and wherein each said bitmap image impression is processed serially, using the processor, in near realtime by step b).

13. The method of claim 12 further comprising:
c) providing, using the processor, a positive confirmation to an external indicator as each bitmap impression is added to said reconstruction set; and
d) providing, using the processor, a negative confirmation to an external indicator as each bitmap impression is excluded from said reconstruction set.

14. The method of claim 1 wherein said processing step b) further comprises adding, using the processor, multiple bitmap images into said reconstruction set in response to detection of a correlation chain.

15. An apparatus for producing a final pattern map from a set of bitmap images, each bitmap image including a portion of a pattern from a pattern source, comprising:
a pattern collector producing one or more of digital representations of the portions of the patterns from the pattern source; and
a processing system, coupled to said pattern collector, including a processor and a memory and a matching engine coupled to said processor, said memory storing a plurality of computer executable instructions wherein said processing system is configured to execute said plurality of computer executable instructions to:
a) select, using said processor, one of the bitmap images as a foundation image having a foundation pattern portion of a foundation pattern source, wherein the foundation image is the image from the set of bitmap images that has the greatest number of correlations with the other images of the set of bitmap images; and thereafter
b) process, using said matching engine, the set of bitmap images to determine a reconstruction set of bitmap images, the portion of the pattern of each said bitmap image of said reconstruction set matched or correlated to said foundation pattern portion;
wherein said reconstruction set of bitmap images excludes each bitmap image from the set of bitmap images with its portion of the pattern not matched or not correlated to said foundation pattern portion.

16. A non-transitory computer readable medium with computer executable instructions stored thereon executed by a processor to perform a method of producing a final pattern map from a set of bitmap images, each bitmap image including a portion of a pattern from a pattern source, the computer executable instructions configured to cause a processing system to:
a) select, using the processor, one of the bitmap images as a foundation image having a foundation pattern portion of a foundation pattern source, wherein the foundation image is the image from the set of bitmap images that has the greatest number of correlations with the other images of the set of bitmap images; and thereafter
b) process, using a matching engine coupled to the processor, the set of bitmap images to determine a reconstruction set of bitmap images, the portion of the pattern of each said bitmap image of said reconstruction set matched or correlated to said foundation pattern portion;
wherein said reconstruction set of bitmap images excludes each bitmap image from the set of bitmap images with its portion of the pattern not matched or not correlated to said foundation pattern portion.

17. A machine-implemented method for producing a final pattern map from a set of bitmap images, each bitmap image including a portion of a pattern from a pattern source, the method comprising:
- a) selecting, using a processor coupled to a matching engine included in a digital pattern matching system having said processor executing instructions retrieved from a memory, one of the bitmap images as a foundation image having a foundation pattern portion of a foundation pattern source; and thereafter
- b) processing, using the processor, the set of bitmap images to determine a reconstruction set of bitmap images, the portion of the pattern of each said bitmap image of said reconstruction set matched or correlated to said foundation pattern portion;

wherein said reconstruction set of bitmap images excludes each bitmap image from the set of bitmap images with its portion of the pattern not matched or not correlated to said foundation pattern portion;

wherein said step b) further includes:
- b1) selecting serially, using said processor, each bitmap image of the set of bitmap images as a next bitmap image;
- b2) evaluating, using said matching engine, each next bitmap image whether its portion of the pattern is matched or correlated to said foundation pattern portion;
- b3) adding, using said processor, said next bitmap image to said reconstruction set when matched or correlated;
- b4) adding, using said processor, said next bitmap image to a reserve set of bitmap images when not matched or not correlated; and
- b5) repeating, using said processor and a different one bitmap image from one of the set of bitmap images from said reserve set of bitmap images as said next bitmap image, a set of steps including steps b2)-b4) until a termination event occurs;

wherein said processing step b) further comprises substituting a different bitmap image from the set of bitmap images for said foundation image when a shuffle condition is set; resetting the reserve set, and thereafter reprocessing step b) using the set of bitmap images against said different bitmap image.

18. The method of claim 17 wherein said shuffle condition includes a ratio of a number of bitmap images in said reserve set as compared to a number of bitmap images in said reconstruction set.

19. The method of claim 17 wherein said shuffle condition includes a quality metric for a reconstruction pattern responsive to a number of bitmap images in said reconstruction set, wherein said shuffle condition is set when a ratio of said quality metric as compared to a predetermined target quality metric has a predetermined relationship.

20. The method of claim 17 wherein said reconstruction set represents a validated set of bitmap images, further comprising: recording, using said processor and responsive to said termination event, said validated set of bitmap images into a trusted registration memory.

* * * * *